US006721839B1

(12) United States Patent
Bauman et al.

(10) Patent No.: US 6,721,839 B1
(45) Date of Patent: Apr. 13, 2004

(54) METHOD OF MAPPING MULTIPLE ADDRESS SPACES INTO SINGLE PCI BUS

(75) Inventors: Ellen Marie Bauman, Rochester, MN (US); David Lee Dosch, Rochester, MN (US); Charles Scott Graham, Rochester, MN (US); Brian Gerard Holthaus, Oronoco, MN (US); Daniel Robert Lipps, Kasson, MN (US); Daniel Frank Moertl, Rochester, MN (US); Paul Edward Movall, Rochester, MN (US); Daniel Paul Wetzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 09/748,983

(22) Filed: Dec. 27, 2000

(51) Int. Cl.⁷ ............................................. G06F 13/00
(52) U.S. Cl. ........................ 710/305; 710/306; 710/315
(58) Field of Search ................... 710/100, 300, 710/104, 105, 305, 306, 307, 308, 310, 311, 312, 313, 314, 315; 711/1, 202, 212, 220; 709/200

(56) References Cited

U.S. PATENT DOCUMENTS

| | | | | |
|---|---|---|---|---|
| 5,560,013 A | * | 9/1996 | Scalzi et al. ................. | 717/138 |
| 5,560,038 A | * | 9/1996 | Haddock .................... | 709/236 |
| 5,604,867 A | * | 2/1997 | Harwood .................... | 709/233 |
| 5,764,924 A | * | 6/1998 | Hong ......................... | 710/300 |
| 5,828,853 A | * | 10/1998 | Regal ......................... | 710/315 |
| 5,848,249 A | * | 12/1998 | Garbus et al. .............. | 710/311 |
| 5,909,559 A | * | 6/1999 | So ............................. | 710/307 |
| 5,987,590 A | * | 11/1999 | Wing So .................... | 712/35 |
| 6,012,120 A | * | 1/2000 | Duncan et al. ............. | 710/308 |
| 6,161,161 A | * | 12/2000 | Botkin et al. ............... | 710/313 |
| 6,266,731 B1 | * | 7/2001 | Riley et al. ................. | 710/313 |
| 6,427,200 B1 | * | 7/2002 | Wu ............................. | 711/220 |

FOREIGN PATENT DOCUMENTS

JP    411317062 A  * 11/1999  ........... G11B/31/00

OTHER PUBLICATIONS

"Memory Map for a Desktop PowerPC System", IBM Technical Disclosure Bulletin, May 1995, vol. 38, issue 5, p. 277–280.*
"Address Mapping of Industry Standard Architecture Masters in the PowerPC Reference Platform", IBM Technical Disclosure Bulletin, Mar. 1995, vol. 38, issue 3, pp. 9–10.*
"PCI Bus Address Translation Logic", Research Disclosure, Apr. 1999, vol. 42, issue 420.*

* cited by examiner

Primary Examiner—Xuan M. Thai
(74) Attorney, Agent, or Firm—Joan Pennington

(57) ABSTRACT

A method and apparatus are provided for mapping multiple address spaces into a single bus, such as a single peripheral component interconnect (PCI) bus. The single bus is coupled to a first processor complex and a second processor complex. An original address of a memory access is shifted to a unique address space for each originator/target of an operation. The shifted address is used on the single bus. Then the shifted address is shifted back to the original address for completing the operation on a destination bus. The original address of a memory access is shifted to a unique address space for each originator/target of an operation using a respective predefined value (+X1, +X2, or +X3) for shifting the original address above a predefined boundary for each originator/target of the operation. Shifting back the shifted address to the original address for completing the operation on the destination bus uses a respective predefined value (–X1, –X2, or –X3) for the shifted back address to the original address for completing the operation on the destination bus. Using the shifted address on the single bus utilizes a dual address cycle (DAC) of the single bus for the shifted address. Completing the operation on a destination bus utilizes a single address cycle (SAC) of the destination bus for the shifted back address to the original address.

18 Claims, 9 Drawing Sheets

HOST PREFETCHABLE MEMORY BASE AND LIMIT 300

BIT BREAKDOWN

MSB(31) - LSB(00)

| Bits | NAME | DESCRIPTION | TYPE |
|---|---|---|---|
| 31:16 | PREFETCHABLE MEMORY LIMIT | THESE BITS WILL ALWAYS BE READ AS FFF1h TO SIGNAL THAT DAC IS SUPPORTED. | R |
| 15:00 | PREFETCHABLE MEMORY BASE | THESE BITS WILL ALWAYS BE READ AS FFF1h TO SIGNAL THAT DAC IS SUPPORTED. | R |

FIG. 3

| BIT BREAKDOWN MSB(31) - LSB(00) | NAME | HOST PREFETCHABLE BASE UPPER 32 BITS 400 DESCRIPTION | TYPE |
|---|---|---|---|
| 31:00 | UPPER BASE | UPPER 32-BITS OF PREFETCHABLE BASE ADDRESS USED FOR DAC | R/W |

FIG. 4

| BIT BREAKDOWN MSB(31) - LSB(00) | NAME | HOST PREFETCHABLE LIMIT UPPER 32 BITS 500 DESCRIPTION | TYPE |
|---|---|---|---|
| 31:00 | UPPER LIMIT | UPPER 32-BITS OF PREFETCHABLE LIMIT ADDRESS USED FOR DAC | R/W |

FIG. 5

HOST DMA MEMORY WINDOW CONTROL REGISTER 600

| BIT BREAKDOWN MSB(31)–LSB(00) | NAME | DESCRIPTION | TYPE |
|---|---|---|---|
| 31 | RESERVED | RESERVED =0b | R |
| 30:28 | DIVISION SIZE | THESE BITS ARE USED TO CONVEY THE SIZE OF EACH OF THE FOUR RANGES ALLOCATED TO A SLOT OR THE DMA ENGINE. THIS VALUE IS IN INCREMENTS OF A POWER OF 2 MULTIPLIED BY 4 GB.<br>0h:4 GB WINDOWS<br>1h:8 GB WINDOWS<br>2h:16 GB WINDOWS<br>3h:32 GB WINDOWS<br>4h:64 GB WINDOWS<br>5h:128 GB WINDOWS<br>6h:256 GB WINDOWS<br>7h:512 GB WINDOWS<br><br>THIS CONFIGURATION MUST BE SET BY THE HOST TO MATCH THE HOST PCI BUS ROUTING TABLES. | R/W |
| 27 | RESERVED | RESERVED=0b | R |
| 26 | ENABLE WINDOW 1 | WHEN 1b, CHIP 114 WILL ROUTE TRANSACTIONS TO WINDOW 1 THROUGH LOCAL FUNCTION 2. WHEN 0b, CHIP 114 WILL NOT CLAIM ACCESS TO WINDOW 1. | R |
| 25 | ENABLE WINDOW 2 | WHEN 1b, CHIP 114 WILL ROUTE TRANSACTIONS TO WINDOW 2 THROUGH LOCAL FUNCTION 3. WHEN 0b, CHIP 114 WILL NOT CLAIM ACCESS TO WINDOW 2. | R |
| 24 | ENABLE WINDOW 3 | WHEN 1b, CHIP 114 WILL ROUTE TRANSACTIONS TO WINDOW 3 THROUGH LOCAL FUNCTION 4. WHEN 0b, CHIP 114 WILL NOT CLAIM ACCESS TO WINDOW 3. | R |
| 23:0 | RESERVED | RESERVED=0b | R |

FIG. 6

HOST CONFIGURE BUS NUMBER TRANSLATE 700

| BIT BREAKDOWN MSB(31) LSB(00) | NAME | DESCRIPTION | TYPE |
|---|---|---|---|
| 31:24 | FUNCTION 2 BUS NUMBER | THIS IS THE BUS NUMBER THAT WILL BE PLACED ON THE HOST BUS FOR A TYPE 1 CONFIGURATION CYCLE FROM LOCAL BUS FUNCTION 2 | R/W |
| 23:16 | FUNCTION 3 BUS NUMBER | THIS IS THE BUS NUMBER THAT WILL BE PLACED ON THE HOST BUS FOR A TYPE 1 CONFIGURATION CYCLE FROM LOCAL BUS FUNCTION 3 | R/W |
| 15:8 | FUNCTION 4 BUS NUMBER | THIS IS THE BUS NUMBER THAT WILL BE PLACED ON THE HOST BUS FOR A TYPE 1 CONFIGURATION CYCLE FROM LOCAL BUS FUNCTION 4 | R/W |
| 7:0 | HOST TO LOCAL TRANSLATE | THESE BITS WILL BE ADDED TO THE BUS NUMBER FOR ANY TYPE 1 CONFIGURE CYCLE PASSED FROM THE HOST TO THE LOCAL BUS | R/W |

FIG. 7

LOCAL IO SPACE WINDOW REGISTER 800

BIT BREAKDOWN
MSB(31) - LSB(00)

| Bits | NAME | DESCRIPTION | TYPE |
|---|---|---|---|
| 31:16 | LOCAL PREFIX | THIS IS USED AS BITS 31:16 OF A VALUE TO BE ADDED TO THE LOCAL BUS ADDRESS WHEN THE CHIP 114 IO BASE/LIMIT REGISTER IS ACCESSED. THE SUM IS THE ADDRESS THAT IS USED ON THE HOST PCI BUS 120 WHEN CHIP 114 INITIATES THE TRANSACTION ON THE HOST BUS. | R/W |
| 15:00 | RESERVED | RESERVED=B'0' | R |

FIG. 8

IO SUBDIVIDE IO WINDOW 900

BIT BREAKDOWN MSB(31) - LSB(00)

| Bits | NAME | DESCRIPTION | TYPE |
|---|---|---|---|
| 31:16 | LIMIT | AD BITS 31:16 THAT DEFINE THE END OF THE IO RANGE WINDOW TO PASS TO THE SECONDARY PCI BUS 124, 126, 128. | R/W |
| 15:00 | BASE | AD BITS 15:00 THAT DEFINE THE START OF THE IO RANGE WINDOW TO PASS TO THE SECONDARY PCI BUS 124, 126, 128. | R/W |

FIG. 9

IO CONTROL 1000

BIT BREAKDOWN MSB(31) - LSB(00)

| Bits | NAME | DESCRIPTION | TYPE |
|---|---|---|---|
| 31:16 | ADDRESS DELTA | BITS 31:16 IS ADDED TO THE AD BITS 31:16 BEFORE THIS PACKET IS PASSED ON TO ANOTHER SLOT | R/W |
| 15:12 | DESTINATION SLOT NUMBER | THIS IS THE SLOT TO ROUTE THE PACKET TO THAT WAS DEFINED BY THE PREVIOUS BASE AND LIMIT REGISTERS | R/W |
| 11:0 | RESERVED | BITS = 0 | R |

FIG. 10

| BIT BREAKDOWN MSB(31) - LSB(00) | NAME | MEMORY WINDOW 1100 DESCRIPTION | TYPE |
|---|---|---|---|
| 31:16 | LIMIT | AD BITS 31:16 THAT DEFINE THE END OF THE MEMORY RANGE WINDOW TO PASS TO THE SECONDARY PCI BUS 124, 126, 128. | R/W |
| 15:00 | BASE | AD BITS 15:00 THAT DEFINE THE START OF THE MEMORYRANGE WINDOW TO PASS TO THE SECONDARY PCI BUS 124, 126, 128. | R/W |

FIG. 11

| BIT BREAKDOWN MSB(31) - LSB(00) | NAME | MEMORY CONTROL 1200 DESCRIPTION | TYPE |
|---|---|---|---|
| 31:16 | ADDRESS DELTA | BITS 31:16 IS ADDED TO THE AD BITS 31:16 BEFORE THIS PACKET IS PASSED ON TO ANOTHER SLOT | R/W |
| 15:12 | DESTINATION SLOT NUMBER | THIS IS THE SLOT TO ROUTE THE PACKET TO THAT WAS DEFINED BY THE PREVIOUS BASE AND LIMIT REGISTERS | R/W |
| 11:0 | RESERVED | BITS = 0 | R |

METHOD OF MAPPING MULTIPLE ADDRESS SPACES INTO SINGLE PCI BUS

FIELD OF THE INVENTION

The present invention relates generally to the data processing field, and more particularly, relates to a method and apparatus for mapping multiple address spaces into a single bus, such as a peripheral component interconnect (PCI) bus.

DESCRIPTION OF THE RELATED ART

Servers and other computer systems are becoming increasingly complex. One proposed server design contains two complete but separate processor architectures. For example, a first complex is a Pentium complex and the second complex is an IBM Power PC based processor used to provide an interface for storage media, local area network (LAN) adapters and an internal communication path of the first complex. The Power PC based I/O processor architecture is physically limited to a defined number of bits, such as 32 bits on both the peripheral component interconnect (PCI) bus and the internal processor buses. It is required that the Pentium memory be completely addressable from the PCI bus. In known designs, the amount of Pentium memory is limited such that both the I/O processor PCI bus address needs and the amount of Pentium memory both fit within a single 32 bit PCI bus address space.

It is desirable to allow an increased amount of Pentium memory, for example, in excess of 4 gigabytes (GB). A need exists for a way to access data on the PCI buses that accommodate both the I/O processor complex needs and the Pentium complex.

SUMMARY OF THE INVENTION

A principal object of the present invention is to provide a method and apparatus for mapping multiple address spaces into a single bus, such as a single peripheral component interconnect (PCI) bus. Other important objects of the present invention are to provide such method and apparatus for mapping multiple address spaces into a single peripheral component interconnect (PCI) bus substantially without negative effect; and that overcome many of the disadvantages of prior art arrangements.

In brief, a method and apparatus are provided for mapping multiple address spaces into a single bus, such as a single peripheral component interconnect (PCI) bus. The single bus, such as a single peripheral component interconnect (PCI) bus is coupled to a first processor complex and a second processor complex. An original address of a memory access is shifted to a unique address space for each originator/target of an operation. The shifted address is used on the single bus. Then the shifted address is shifted back to the original address for completing the operation on a destination bus.

In accordance with features of the invention, the original address of a memory access is shifted to a unique address space for each originator/target of an operation using a respective predefined value (+X1, +X2, or +X3) for shifting the original address above a predefined boundary for each originator/target of the operation. Shifting back the shifted address to the original address for completing the operation on the destination PCI bus uses a respective predefined value (-X1, -X2, or -X3) for the shifted back address to the original address for completing the operation on the destination PCI bus. Using the shifted address on the single PCI bus utilizes a dual address cycle (DAC) of the single PCI bus for the shifted address. Completing the operation on a destination PCI bus utilizes a single address cycle (SAC) of the destination PCI bus for the shifted back address to the original address.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a diagram illustrating an exemplary bit breakdown for host prefetchable memory base and limit register values in an interface multifunction PCI to PCI bridge chip configuration space of the computer system of FIG. 1 in accordance with the preferred embodiment;

FIG. 4 is a diagram illustrating an exemplary bit breakdown for host prefetchable memory base upper 32 bits register values in the interface multifunction PCI to PCI bridge chip configuration space of the computer system of FIG. 1 in accordance with the preferred embodiment;

FIG. 5 is a diagram illustrating an exemplary bit breakdown for host prefetchable memory base limit upper 32 bits register values in the interface multifunction PCI to PCI bridge chip configuration space of the computer system of FIG. 1 in accordance with the preferred embodiment;

FIG. 6 is a diagram illustrating an exemplary bit breakdown for host DMA memory window control register values in the interface multifunction PCI to PCI bridge chip configuration space of the computer system of FIG. 1 in accordance with the preferred embodiment;

FIG. 7 is a diagram illustrating an exemplary bit breakdown for host configuration bus number translation register values in the interface multifunction PCI to PCI bridge chip configuration space of the computer system of FIG. 1 in accordance with the preferred embodiment;

FIG. 8 is a diagram illustrating an exemplary bit breakdown for local IO space window register values in the interface multifunction PCI to PCI bridge chip configuration space of the computer system of FIG. 1 in accordance with the preferred embodiment;

FIG. 9 is a diagram illustrating an exemplary bit breakdown for IO subdivide in a multifunction PCI to PCI bridge chip configuration space of the computer system of FIG. 1 in accordance with the preferred embodiment;

FIG. 10 is a diagram illustrating an exemplary bit breakdown for IO control in the multifunction PCI to PCI bridge chip configuration space of the computer system of FIG. 1 in accordance with the preferred embodiment;

FIG. 11 is a diagram illustrating an exemplary bit breakdown for memory subdivide in the multifunction PCI to PCI bridge chip configuration space of the computer system of FIG. 1 in accordance with the preferred embodiment; and FIG. 12 is a diagram illustrating an exemplary bit breakdown for memory subdivide in the multifunction PCI to PCI bridge chip configuration space of the computer system of FIG. 1 in accordance with the preferred embodiment.

DETAILED DESCRIPTION OF THE PREFERRED EMBODIMENTS

Figure 1:
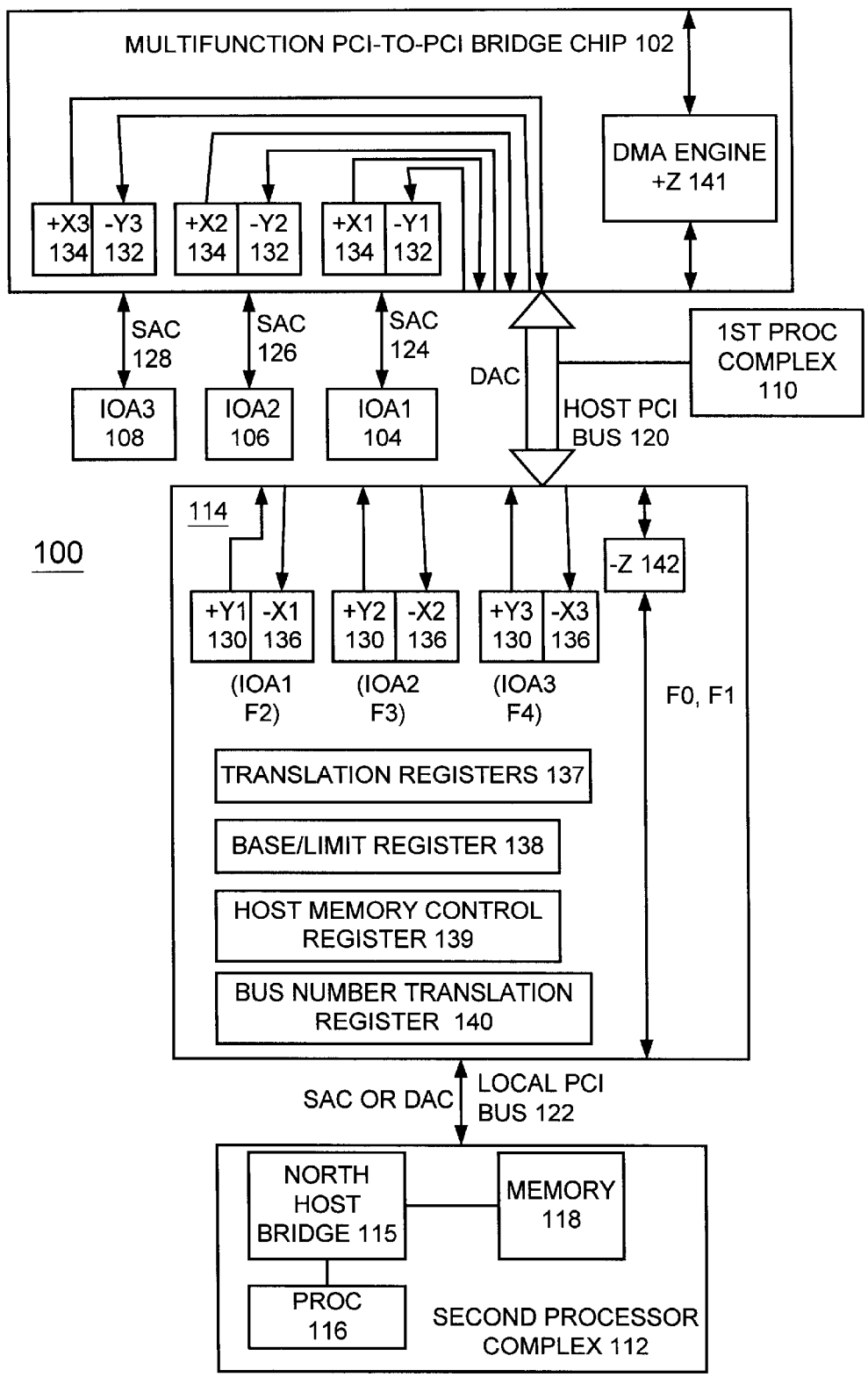
FIG. 1 is a block diagram representation illustrating a computer system for implementing methods for mapping multiple address spaces into a single peripheral component interconnect (PCI) bus in accordance with the preferred embodiment.

Having reference now to the drawings, in FIG. 1, there is shown a computer or data processing system of the preferred embodiment generally designated by the reference character 100. As shown in FIG. 1, computer system 100 includes a multifunction peripheral component interconnect (PCI) to PCI bridge chip 102 coupled to a plurality of local area network (LAN) input/output adapters (IOAs) 104, 106 and 108. Multifunction PCI to PCI bridge chip 102 is coupled to a first processor complex 110. First processor complex 110 is, for example, an input/output processor (IOP) and interface complex. A second processor complex 112 is coupled to the multifunction PCI to PCI bridge chip 102 via an interface multifunction PCI to PCI bridge chip 114. Second processor complex 112 is, for example, an Intel Pentium based complex including a north host bridge 115 coupled to the local PCI bus 122, a processor 116, such as an Intel Pentium processor, and to a processor memory 118.

A shared host PCI bus 120 connects the multifunction PCI to PCI bridge chip 102 and first IO processor complex 110, and the second processor complex 112 via the interface multifunction PCI to PCI bridge chip 114. A local PCI bus 122 is connected between the second processor complex 112 and the interface multifunction PCI to PCI bridge chip 114. IO adapters 104, 106 and 108 are connected under the multifunction PCI to PCI bridge chip 102 by a plurality of separate PCI buses 124, 126 and 128, respectively.

In accordance with features of the preferred embodiment, a method is provided to access data on the PCI buses that accommodate both the needs of the I/O processor complex 110 and the second processor complex 112. A shifted address of memory accesses to unique address spaces, such as unique 4 GB address spaces for each of the possible originators/targets of an operation. Then the shifted address is used on the shared host PCI bus 120. The shifted address utilizes a Dual Address Cycle feature of the PCI architecture, which allows generation of 64 bit addresses on a 32 bit bus. The address is then shifted back to its original value before the operation is completed on the final destination PCI bus. To enable both the second processor complex 112 and the first IO processor complex 110 to have addressing capabilities on the host PCI bus 120 connecting the two architectures, the interface multifunction PCI to PCI bridge chip 114 and the multifunction PCI to PCI bridge chip 102 are implemented to use the Dual Address Cycle feature of the PCI architecture. In addition both the interface multifunction PCI to PCI bridge chip 114 and the multifunction PCI to PCI bridge chip 102 implement a set of base/limit registers and DMA window registers to allow data accesses to shift to and from the address range above 32 bits.

In accordance with features of the preferred embodiment, memory accesses going between the second processor complex 112 and the IO adapters 104, 106 and 108 and address cycles from the system for DMAs to the processor memory 118 of the second processor complex 112 are enabled. The IO adapters 104, 106 and 108 appear to the processor 116 of the second processor complex 112 to be sitting behind predefined PCI to PCI bridge functions, such as functions 2, 3 and 4 of the interface multifunction PCI to PCI bridge chip 114, the IO adapters 104, 106 and 108 actually are connected off separate PCI busses 124, 126, 128 under the multifunction PCI to PCI bridge chip 102 that is connected to the interface multifunction PCI to PCI bridge chip 114.

For memory cycles from the processor 116 of the second processor complex 112 to the IO adapters 104, 106 and 108, the interface multifunction PCI to PCI bridge chip 114 implements a memory space translation register 137 for each function. Memory cycles bound for functions 2, 3 and 4 then use this value 130 (+Y1, +Y2, or +Y3) to shift the address to the corresponding region above the 32 bit boundary before the interface multifunction PCI to PCI bridge chip 114 forwards the access to the host PCI bus 120. The multifunction PCI to PCI bridge chip 102 is then set up with a corresponding base/limit in its routing tables and use that value 132 (-Y1, -Y2, or -Y3) before forwarding the memory cycle out to the IOA PCI bus 124, 126 or 128 as a Single Address Cycle (SAC) with the original address value.

For memory cycles from the IO adapters 104, 106 and 108 to the processor memory 118, multifunction PCI to PCI bridge chip 102 does a plus translation and passes it on to the interface multifunction PCI to PCI bridge chip 114. The interface multifunction PCI to PCI bridge chip 114 implements a 64 bit base and limit window divided up such that each incoming memory cycle is directed based on the offset in the preset base/limit registers in the interface multifunction PCI to PCI bridge chip 114. This incoming window is implemented in the interface multifunction PCI to PCI bridge chip 114 in two steps:

First, a base/limit register 138 defined in the host configuration space of interface multifunction PCI to PCI bridge chip 114 creates a window for host memory cycles to the interface multifunction PCI to PCI bridge chip 114. Second, once the interface multifunction PCI to PCI bridge chip 114 acknowledges the transaction in this space, a host memory control register 139 defined in the host configuration space of interface multifunction PCI to PCI bridge chip 114 is used to further divide the window into small, equal sized windows and direct the transaction to the proper PCI function. This PCI register 139 contains bits that specify the equal division for each space starting at 4 GB and which of four memory windows are enabled to accept cycles.

The interface multifunction PCI to PCI bridge chip 114 includes a bus number translation register 140. A host configuration bus number translation is illustrated and described with respect to FIG. 7. For the IO adapters 104, 106 and 108, the multifunction PCI to PCI bridge chip 102 has corresponding translate values 134 (+X1, +X2, or +X3) set in its registers that takes the address the IOA provides, shifts the address to the translated value and provide the shifted address on the host PCI bus 120 as a Dual Address Cycle (DAC). When the interface multifunction PCI to PCI bridge chip 114 receives this cycle, it sees that the cycle is in its window for DACs and finds which division the cycle falls within. Interface multifunction PCI to PCI bridge chip 114 then performs the corresponding address translation 136 (-X1, -X2, or -X3) and provides the shifted back address to the local PCI bus 122 as a SAC.

Another type of memory access utilizing the DAC are the address cycles generated by a DMA engine 141 in the multifunction PCI to PCI bridge chip 102. The DMA engine 141 shifts its addresses above the 4 GB boundary (+Z). These cycles use the same function provided for the IOA cycles with interface multifunction PCI to PCI bridge chip 114 as the target on the host PCI bus 120, and always start at the beginning of the base/limit region. When the interface multifunction PCI to PCI bridge chip 114 receives this cycle, it sees that the cycle is in its window for DACs and performs a translation 142 (-Z) that puts the cycle back in the SAC or DAC space of the local PCI bus 120.

Since all memory accesses between the second processor complex 112, the IO adapters 104, 106 and 108, and the DMA engine 141 in the multifunction PCI to PCI bridge chip 102 are shifted to address spaces above a predefined boundary, such as the described 4 GB boundary, the address space for 0 to 4 GB is available to be used by the first processor complex 110.

Figure 2:
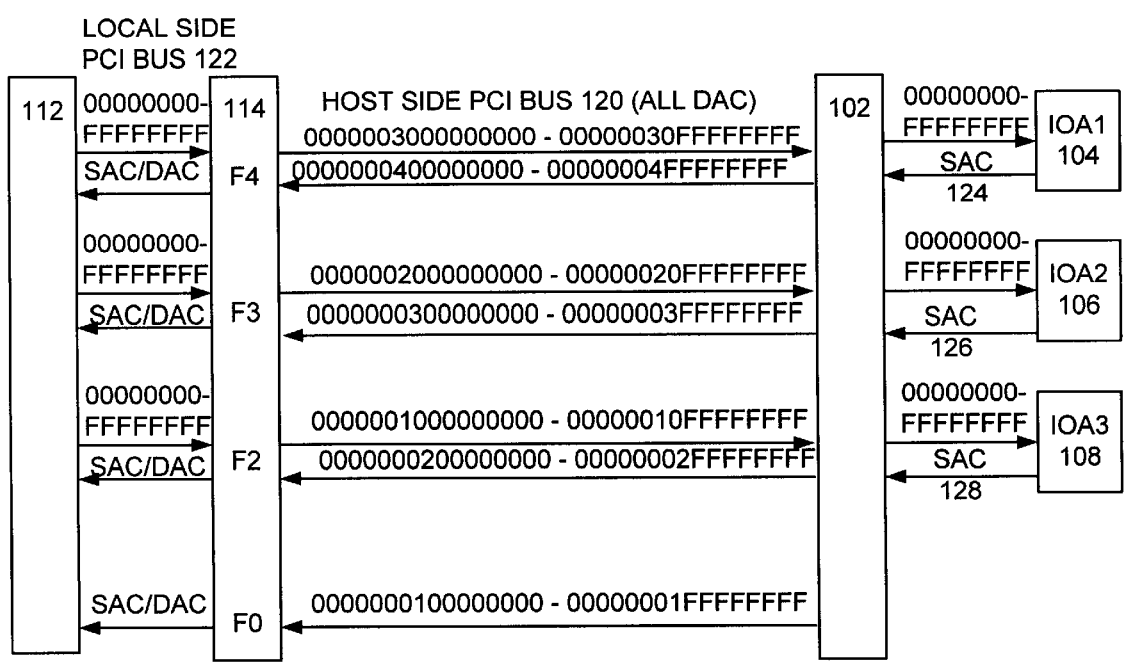
FIG. 2 is a block diagram representation illustrating an exemplary address map for accesses on a host PCI bus to a processor complex and to input output adapters (IOAs) of the computer system of FIG. 1 in accordance with the preferred embodiment.

FIG. 2 is a block diagram representation illustrating an exemplary address map for accesses on the host PCI bus to the second processor complex 112 and to IO adapters 104, 106, 108 in accordance with the preferred embodiment. As an example of the address map on the host PCI bus 120 consider the case where:

Host prefetchable Base/Limit Upper set to: 00000001000000000-00000004FFFFFFFFF and DMA Control Register is set to have four regions enabled of 4 GB each.

For accesses to processor memory 118 the following address spaces are allocated on the host PCI bus 120:

00000001000000000-00000001FFFFFFFF to DMA region;
00000002000000000-00000002FFFFFFFF to traffic from IOA3 108;
00000003000000000-00000003FFFFFFFF to traffic from IOA2 106; and
00000004000000000-00000004FFFFFFFF to traffic from IOA1 104.

For accesses to IOAs 104, 106, 108 from the second processor complex 112:

Function 2 memory Base/Limit set to 0000001000000000-0000000100FFFFFFFF;
Function 3 memory Base/Limit set to 0000002000000000-0000000200FFFFFFFF; and
Function 4 memory Base/Limit set to 0000003000000000-0000000300FFFFFFFF.

This gives each memory access path its own unique 4 GB address space and allows each IO adapter 104, 106, and 108 as well a DMA path into the processor memory 118 to be completely addressable. Since all memory accesses originating or targeting busses other than the host PCI bus 120 have their addresses shifted to ranges above 4 GB, memory accesses by IOP 110 can use the address space from 0 to 4 GB without interference. Although this example uses 4 GB, it should be understood that each accessing window can be as large as needed, and still be accessed via the same 32 bit PCI bus 120, as long as the sum of all windows inclusive is smaller than 64 bits of addressing.

A similar problem exists for sharing the 32 bit PCI IO address space. In this case the second processor 116 only uses the low order 64 KB of the address space. The design used to allow both the IOP complex 110 and the second processor complex 112 to share a single 4 GB address space is extended to allow the second complex 112 and the IOP complex 110 to share a single 64 KB IO space. This is implemented by shifting the IO address to an address space above the 64 KB boundary using a value implemented in the multifunction PCI to PCI bridge chip 102 and the interface multifunction PCI to PCI bridge chip 114 of (+X or +Y), and then shifting back of (−X or −Y) to the original 64 KB address space as the IO cycle completes to the IOA 104, 106, or 108, or to the processor 116 of the second processor complex 112.

FIG. 3 illustrates an exemplary bit breakdown for register values for a host prefetchable memory base and limit 300 in the interface multifunction PCI to PCI bridge chip 114 configuration space in accordance with the preferred embodiment. Accesses to this space can be 0, 1, 2, 3, 4, 8 bytes and bursting. As shown, this memory base/limit 300 has a 4 G minimum size and a 4 G address boundary restriction.

FIG. 4 illustrates an exemplary bit breakdown for register values for a host prefetchable memory base upper 32 bits 400 in the interface multifunction PCI to PCI bridge chip 114 configuration space in accordance with the preferred embodiment. A DAC address greater than or equal to the base and less than or equal to the limit will be routed to the local bus. This base/limit function is disabled if this register 400 is loaded with zeros.

FIG. 5 illustrates an exemplary bit breakdown for register values for a host prefetchable memory base limit upper 32 bits 500 in the interface multifunction PCI to PCI bridge chip 114 configuration space in accordance with the preferred embodiment. A DAC address greater than or equal to the base and less than or equal to the limit will be routed to the local bus.

FIG. 6 illustrates an exemplary bit breakdown for register values for a host DMA memory window control register 600 in the interface multifunction PCI to PCI bridge chip 114 configuration space in accordance with the preferred embodiment. Host DMA memory window control register 600 is used to manage the host PCI bus 120 to local PCI bus MMIOs addressed to the host PCI bus base/limit register. Host DMA memory window control register 600 provides control information for dividing the host PCI bus base/limit register in four equal sized windows allow PCI trace functions to trace the three IOA slots and the DMA engine accesses separately. Host DMA memory window control register 600 is intended to be used by the host DMA engines to access local memory. An example windows ordering follows:

DMA Window 0—DMA engine
DMA Window 1—Local Function 2
DMA Window 2—Local Function 3
DMA Window 3—Local Function 4

FIG. 7 illustrates an exemplary host configuration bus number translation 700 in the interface multifunction PCI to PCI bridge chip 114 in accordance with the preferred embodiment. FIG. 7 shows an exemplary bit breakdown for a mask used to translate configure bus numbers between the local PCI bus 122 and the host PCI bus 120. If the register for a function is zero, then multifunction PCI to PCI bridge interface chip 114 does not claim the configuration cycles on the local PCI bus 122 for that function.

FIG. 8 illustrates an exemplary bit breakdown for register values for a local IO space window register 800 in the interface multifunction PCI to PCI bridge chip 114 configuration space in accordance with the preferred embodiment. The local IO space window register 800 is used to manage the local PCI bus to host PCI bus IO operations addressed to the local PCI bus bridge IO base/limit. The value in this local IO space window register 800 is 64 KB aligned and is added to the local bus address when the interface multifunction PCI to PCI bridge chip 114 I/O Base/Limit is being accessed. The sum is the address to be placed on the host PCI bus 120 when the transaction is initiated to the host.

FIG. 9 illustrates an exemplary bit breakdown for an IO subdivide 900 in the configuration space of the multifunction PCI to PCI bridge chip 102 in accordance with the preferred embodiment. The IO subdivide 900 is used to subdivide IO window defining limit and base values.

FIG. 10 illustrates an exemplary bit breakdown for an IO control 1000 in the configuration space of multifunction PCI to PCI bridge chip 102 in accordance with the preferred embodiment. The IO control 1000 is used with subdivide to control the IO window and to control IO cycle translation.

FIG. 11 illustrates an exemplary bit breakdown for a memory subdivide 1100 in the configuration space of the multifunction PCI to PCI bridge chip 102 in accordance with the preferred embodiment. The memory subdivide 1100 is used to subdivide the memory range window.

FIG. 12 illustrates an exemplary bit breakdown for a memory control 1200 in the configuration space of the multifunction PCI to PCI bridge chip 102 in accordance with the preferred embodiment. The memory control 1200 is used with subdivide to control the window and to control memory address translation.

While the present invention has been described with reference to the details of the embodiments of the invention shown in the drawing, these details are not intended to limit the scope of the invention as claimed in the appended claims.

What is claimed is:

1. A method for mapping multiple address spaces into a single bus, such as a single peripheral component interconnect (PCI) bus, coupled to a first processor complex and a second processor complex, said method comprising the steps of:

defining a respective unique address space for each of a plurality of possible originators/targets of an operation;

shifting an original address of a memory access to a said respective unique address space for each originator/target of an operation;

using said shifted address on the single bus; and shifting back said shifted address to said original address for completing said operation on a destination bus.

2. A method for mapping multiple address spaces into a single bus as recited in claim 1 wherein the step of shifting an original address of a memory access to a said respective unique address space for each originator/target of an operation includes the step of using a respective predefined value for shifting said original address above a predefined boundary for each originator/target of said operation.

3. A method for mapping multiple address spaces into a single bus as recited in claim 1 wherein the step of shifting an original address of a memory access to a said respective unique address space for each originator/target of an operation includes the step of using a respective predefined value (+X1, +X2, or +X3) for shifting said original address above a predefined boundary for each originator/target of said operation.

4. A method for mapping multiple address spaces into a single bus as recited in claim 3 wherein the step of shifting back said shifted address to said original address for completing said operation on said destination bus includes the step of using a respective predefined value (−X1, −X2, or −X3) for said shifted back address to said original address for completing said operation on said destination bus.

5. A method for mapping multiple address spaces into a single bus as recited in claim 1 wherein the step of using said shifted address on the single bus includes the step of utilizing a dual address cycle (DAC) of the single bus for said shifted address.

6. A method for mapping multiple address spaces into a single bus as recited in claim 1 wherein the step of using said shifted address on the single bus includes the step of utilizing a single address cycle (SAC) of the single bus for I/O, memory and configuration cycles.

7. A method for mapping multiple address spaces into a single bus as recited in claim 1 wherein the step of shifting back said shifted address to said original address for completing said operation on a destination bus includes the step of utilizing a single address cycle (SAC) of said destination bus for said shifted back address to said original address.

8. Apparatus for mapping multiple address spaces into a single bus comprising:

a first processor complex;

a multifunction PCI to PCI bridge chip coupled to said first processor complex;

a second processor complex;

an interface multifunction PCI to PCI bridge chip coupled to said second processor complex, said interface multifunction PCI to PCI bridge chip coupled between said first processor complex and said multifunction PCI to PCI bridge chip by the single bus;

said interface multifunction PCI to PCI bridge chip and said multifunction PCI to PCI bridge chip being implemented for defining a respective unique address space for each of a plurality of possible originators/targets of an operation; for shifting an original address of a memory access to a said respective unique address space for each originator/target of an operation; for using said shifted address on the single bus; and for shifting back said shifted address to said original address for completing said operation on a destination bus.

9. Apparatus for mapping multiple address spaces into a single bus as recited in claim 8 wherein both said interface multifunction PCI to PCI bridge interface chip and said multifunction PCI to PCI bridge interface chip being implemented for shifting an original address of IO and configuration cycles to a said respective unique address space for each originator/target of an operation; for using said shifted address on the single bus; and for shifting back said shifted address to said original address for completing said operation on a destination bus.

10. Apparatus for mapping multiple address spaces into a single bus as recited in claim 8 wherein said interface multifunction PCI to PCI bridge interface chip includes translation logic for translating a configuration cycle on the single bus to another configuration cycle on said destination bus.

11. Apparatus for mapping multiple address spaces into a single bus as recited in claim 8 wherein both said interface multifunction PCI to PCI bridge chip and said multifunction PCI to PCI bridge chip being implemented for utilizing a dual address cycle (DAC) of the single bus for said shifted address.

12. Apparatus for mapping multiple address spaces into a single bus as recited in claim 9 wherein both said interface multifunction PCI to PCI bridge chip and said multifunction PCI to PCI bridge chip being implemented for utilizing a single address cycle (SAC) of the single bus for said shifted address for said IO and configuration cycles.

13. Apparatus for mapping multiple address spaces into a single bus as recited in claim 8 wherein both said interface multifunction PCI to PCI bridge chip and said multifunction PCI to PCI bridge chip being implemented for shifting back said shifted address to said original address for completing said operation on a destination bus utilizing a single address cycle (SAC) of said destination bus for said shifted back address to said original address.

14. Apparatus for mapping multiple address spaces into a single bus as recited in claim 8 wherein both said interface multifunction PCI to PCI bridge chip and said multifunction PCI to PCI bridge chip implement a set of base and limit registers and a translation register to allow data accesses to shift to and from an address range above a predefined boundary.

15. Apparatus for mapping multiple address spaces into a single bus as recited in claim 8 wherein said interface multifunction PCI to PCI bridge chip implements a DMA window register to route incoming PCI cycles to a correct PCI to PCI bridge function and to perform an address translation.

16. Apparatus for mapping multiple address spaces into a single bus as recited in claim 14 wherein said memory address range above said predefined boundary is an address range above 32 bits.

17. Apparatus for mapping multiple address spaces into a single bus as recited in claim 9 wherein an address range of said IO and configuration cycles is an address range below 32 bits.

18. Apparatus for mapping multiple address spaces into a single bus, such as a peripheral component interconnect (PCI) bus comprising:

a first processor complex;

a multifunction PCI to PCI bridge chip coupled to said first processor complex;

a second processor complex;

an interface multifunction PCI to PCI bridge chip coupled to said second processor complex, said interface multifunction PCI to PCI bridge interface chip coupled between said first processor complex and said multifunction PCI to PCI bridge chip by the single bus;

said interface multifunction PCI to PCI bridge chip and said multifunction PCI to PCI bridge chip being implemented for defining a respective unique address space for each of a plurality of possible originators/targets of an operation; for shifting an original address of a memory access to a said respective unique address space for each originator/target of an operation; for using said shifted address on the single bus utilizing a dual address cycle (DAC) of the single bus for said shifted address; and for shifting back said shifted address to said original address for completing said operation on a destination bus utilizing a single address cycle (SAC) of said destination bus for said shifted back address to said original address.

* * * * *